G. LIDSEEN.
SEALING TOOL OR CHUCK FOR BOTTLES.
APPLICATION FILED AUG. 30, 1911.
1,111,753.
Patented Sept. 29, 1914.
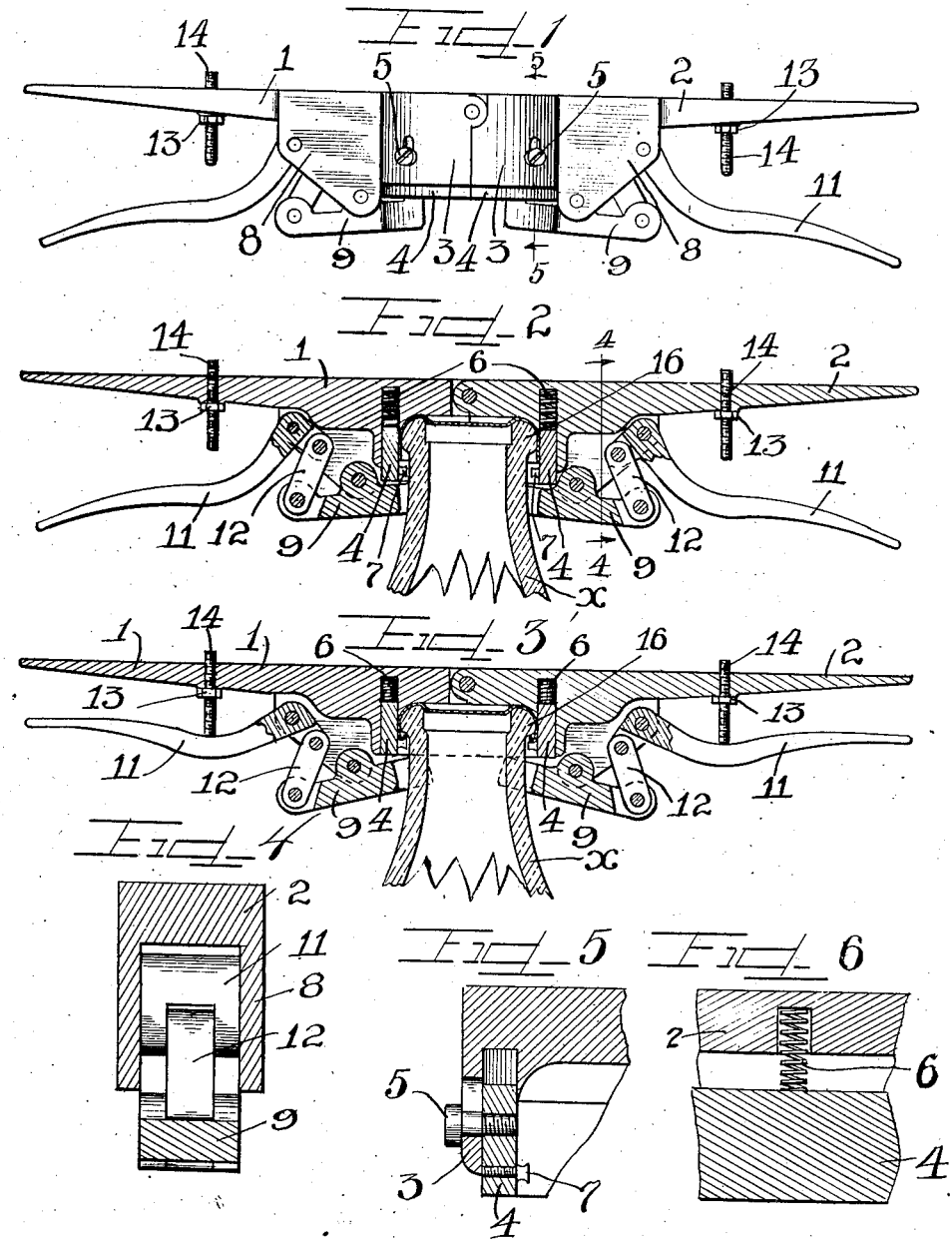

G. LIDSEEN.
SEALING TOOL OR CHUCK FOR BOTTLES.
APPLICATION FILED AUG. 30, 1911.
1,111,753.
Patented Sept. 29, 1914.
2 SHEETS—SHEET 2.
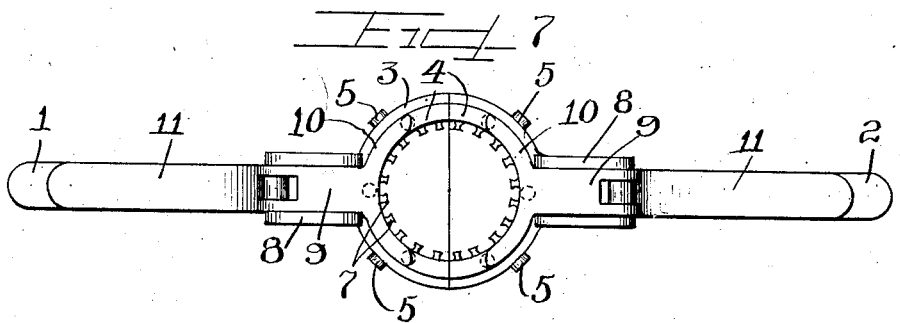
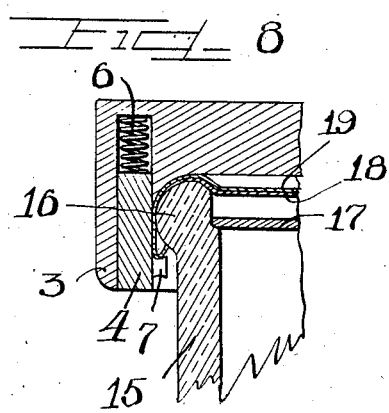

UNITED STATES PATENT OFFICE.

GUSTAVE LIDSEEN, OF CHICAGO, ILLINOIS.

SEALING TOOL OR CHUCK FOR BOTTLES.

1,111,753.   Specification of Letters Patent.   Patented Sept. 29, 1914.

Application filed August 30, 1911.  Serial No. 646,945.

*To all whom it may concern:*

Be it known that I, GUSTAVE LIDSEEN, a citizen of the United States, and a resident of the city of Chicago, in the county of Cook and State of Illinois, have invented certain new and useful Improvements in Sealing Tools or Chucks for Bottles; and I do hereby declare that the following is a full, clear, and exact description of the same, reference being had to the accompanying drawings, and to the numbers of reference marked thereon, which form a part of this specification.

It has become general in many communities, and in practically all large centers of distribution of milk and the like, to furnish what is termed "certified" milk to such consumers who may require the same, and particularly for the use of infants, invalids and others whose health or preference require milk as free as possible from bacteria and contamination.

In the past, it has frequently occurred that, upon test, milk sold as certified or pure milk, when examined in the laboratory, has sometimes been very impure, indicating that the contents of the bottle had been tampered with, or perhaps the bottle refilled. This has heretofore been quite possible, inasmuch as the bottle closures used on such bottles have usually been capable of repeated use, thereby permitting impure milk to be fraudulently sold. It is also true of some of the other closures used for certified milk bottles, that such closures do not prevent the milk from becoming contaminated during transit or after inspection.

The object of this invention is to afford a sealing device or chuck whereby a suitable sealing cap may be applied to milk bottles and the like, in such a manner, as to effectually seal the same from contamination and in such a manner as to necessitate the destruction or such injury of the sealing cap when removed as to preclude its second use.

It is a further object of the invention to afford a sealing tool or chuck adapted to be manually applied in securing the sealing cap upon the bottle, and incapable of injuring or cracking the bottle in applying the seal.

It is also an object of the invention to afford a sealing device of the class described, in which, although the seal is rigidly secured upon the bottle, the pressure exerted in applying the same is expended upon the seal and not upon the bottle, in consequence protecting the bottle from injury.

It is also an object of the invention to afford a construction adapted for rapid use thus economizing greatly in the time heretofore required in sealing such bottles.

It is a further object of the invention to afford a construction in which the seal is effected manually by the operator, and whereby the operator may readily determine in each instance, the efficiency with which the seal was applied by the operation of the tool.

A preferred embodiment of the invention is hereinafter more fully illustrated and described.

In the drawings: Figure 1 is a side elevation of a device embodying my invention. Fig. 2 is a central, longitudinal section thereof, showing the same in position preparatory to sealing. Fig. 3 is a similar view with the cap sealed in place. Fig. 4 is an enlarged section on line 4—4 of Fig. 2. Fig. 5 is an enlarged fragmentary section taken on line 5—5 of Fig. 1. Fig. 6 is an enlarged fragmentary section illustrating the spring engagement of the yielding chuck jaws. Fig. 7 is a bottom plan view of the sealing tool or chuck. Fig. 8 is an enlarged transverse section taken through the chuck at one of the springs, and showing the same in elevation. Fig. 9 is a detail illustrating a construction in which an integral forming lip is provided on each chuck member. Fig. 10 is a section taken below the sealing cap on a milk bottle, and illustrating the seal shown in Figs. 3 and 8. Fig. 11 is a similar view and illustrating the seal afforded when a jaw such as illustrated in Fig. 9, is used in the tool.

As shown in the drawings: The sealing tool comprises levers 1 and 2, articulated or hinged together at their meeting ends and there each enlarged laterally to afford a semi-circular head of considerably larger diameter than the exterior diameter of the bottle mouth to which the seals are to be applied. Integrally connected with each of said heads and extending downwardly therefrom, is a peripheral flange 3, on each, together affording the lateral retaining walls for the chuck jaws 4, as shown two in number, and semi-circular in form, and one of which is slidably and yieldingly supported in each of said heads upon said flange 3. Said flanges 3, as shown in Figs. 1, 5 and 7, are vertically slotted on opposite sides of the handle or lever 1, and extending through said slots and engaging in the chuck jaws 4, as shown in Figs. 1, 5 and 7, are cap screws 5, whereby the jaws are retained in place, and engaged in suitable recesses in the head, and bearing upon the inner edge of each of said chuck jaws 4, are springs 6, as shown in Figs. 2, 3, 6, and 8, and in dotted lines in Fig. 7. Said chuck jaws are provided (in the constructions illustrated in Figs. 2, 3, 7 and 8) with closely arranged apertures, disposed near the lower edge thereof, and extending therethrough and threaded, or otherwise rigidly engaged therein are pins or bolts, the inwardly projecting heads 7, of which are peripherally concaved to afford a shallow, peripheral groove, adapted to engage beneath the edge or apron of the sealing cap to turn the same upwardly, as indicated in Figs. 3 and 8, when the jaws are closed.

Extending downwardly on each side of each handle or lever 1 and 2, and adjacent the head, are parallel flanges 8, and pivotally engaged thereon adjacent the chuck jaws, is a lever 9, having a yoked head 10, shown in Fig. 7, adapted to fit loosely around the bottle neck, and engaging beneath the chuck jaws respectively. Pivotally engaged between said flanges 8, near the outer end thereof, is a bent lever, one end 11, of which extends outwardly beneath the levers 1 and 2, and is adapted to be engaged by the hands, and the other (and shorter) end of which extends inwardly between said flanges and is pivotally connected with the end of the lever 9, by means of a link 12, affording a toggled connection. Extending through each of the levers 1, and provided with a set nut 13, thereon, is an adjusting screw 14, whereby the throw of the toggle lever, in actuating the chuck jaws with the hands, may be readily adjusted.

The operation is as follows: The bottle 15, having the usual outwardly rounded bead or lip 16, thereon, is closed, if desired, by first placing paraffined paper 17, on the interior shoulder. A second sealing closure 18, either of paraffined paper or any suitable material, for example, a rubber ring or sheet 18, if desired, is then placed upon the bead; and a metallic sealing cap 19, usually of thin tinned soft steel, and having an apron or margin sufficiently wide to extend well below the bead 16, and fitting closely therearound, is applied over the mouth of the bottle, as shown in Fig. 2. The sealing tool is then placed over the same, as shown in Fig. 2. This can easily be accomplished, inasmuch as the tool is hinged in halves, and the head readily opens to receive the mouth of the bottle therein.

When in the position shown in Fig. 2, the operator pressing downwardly upon the levers 1 and 2, grips the levers 11, upwardly with the hands, thereby throwing the inner yoked ends 10, of the levers 9, upwardly and carrying the sealing jaws 4, upwardly against the tension of their springs, and rolling the free edge or apron of the sealing cap inwardly and upwardly, as shown in Figs. 3 and 8, and crushing the same firmly against the under side of the bead. Each of the heads 7, on the sealing jaws indents the margin of the cap, giving the same a characteristic fluted appearance on the under side, as illustrated in Fig. 10, and so firmly engaging the same in place that considerable mutilation of the seal is necessary before the same can be removed.

As shown, the central portion of the sealing cap is depressed somewhat, as shown in Fig. 8. This permits the application of any distinguishing trade-mark, character or other indications thereon without danger of injury or mutilation thereof when applied to the bottle.

If desired, the jaws may be constructed as illustrated in Fig. 9, in which, in lieu of the pins 7, used to afford a fluted appearance of the under portion of the seal, a permanent and integral sealing lip 20, is secured on the under side of each of the chuck jaws, and is concaved on its upper side or that engaging the margin of the seal and acts to roll the sealing margin upwardly and inwardly around the bead of the bottle to close the same uniformly and tightly therebeneath, as illustrated in the seal 21, shown in Fig. 11.

Of course, it is to be understood that sealing jaws equipped either with the pin 7, or with the sealing lip 20, may be used, as preferred, and it is to be understood also that any suitable materials may be used beneath, or in conjunction with the sealing caps, as may be preferred. I have shown but one (and that a preferred) embodiment of my invention, and I therefore do not purpose limiting the patent granted thereon except as necessitated by the prior art.

I claim as my invention:

1. In a device of the class described a pair of pivoted handles affording frame members, spring pressed slidably supported semi-circular jaws therein, means thereon adapted to engage the apron of a sealing cap, semi-circular yoke members freely engaging under and supporting said jaws, and toggle levers connected to said yokes acting to force the same upwardly thereby rolling the apron of the cap inwardly and upwardly into engagement with the bottle.

2. A sealing tool of the class described embracing oppositely directed levers hingedly connected together, sealing jaws slidably and yieldingly supported thereon and adapted to encircle a bottle neck, one or more projections on each sealing jaw adapted to engage beneath the margin or apron of a sealing cap applied on the bottle, toggle levers extending beneath the first named lever and adapted to be simultaneously engaged therewith, and acting to move said jaws to roll the margins of the sealing cap upwardly and inwardly against the bottle neck.

3. A device of the class described embracing semi-circular sealing jaws, springs bearing thereagainst, a head adapted to hold a sealing cap upon a bottle mouth, pivoted yoke members supporting said jaws against the springs, toggle levers for actuating said yoke levers to move the sealing jaws upwardly, and means carried on each sealing jaw for rolling the margin of the cap upwardly and inwardly into engagement beneath the bead of the bottle neck.

4. A device of the class described embracing spring pressed, upwardly movable semi-circular jaws adapted to engage and fold a sealing cap and roll the margin thereof upwardly against the bottle to which it is purposed attaching the same, and levers hingedly connected and containing said sealing jaws, and toggle levers adapted to actuate said jaws.

5. In a device of the class described levers hingedly connected, semi-circular sealing jaws carried thereon, grooved pins projecting inwardly of said jaws to engage beneath the margins of a sealing cap, toggle levers extending beneath the first named lever and adapted to be gripped together therewith, a yoke on each engaging beneath each sealing jaw and acting to force the same upwardly, and a gage for limiting the upward movement of the sealing jaw.

6. A sealing device of the class described comprising sections hinged together and adapted to be opened with said sections back to back, and members slidable therein adapted to engage the apron of the seal to deform the same.

7. A bottle sealing mechanism comprising a plurality of hingedly connected sections, each section embracing a recessed member, spring thrust sealing jaws inclosed thereby, and toggle levers connected between said sealing jaws and recessed members adapted to move said jaws under pressure against the bottle seal.

8. A bottle sealing mechanism comprising a pair of articulated sections adapted to open into a position back to back, means exerting a downward pressure on a bottle seal by closing said sections around the bottle, and levers pivoted to said sections and adapted to coact therewith to exert an upward pressure on said seal.

9. A bottle sealing mechanism embracing a pair of recessed hinged members, spring pressed sealing jaws slidable in said recess, yoke cranks engaging beneath said jaws, bell crank levers together with said yokes pivoted to said hinged members and toggle bars connecting the yokes and bell crank levers to communicate pressure to said sealing jaws.

10. A device of the class described comprising sealing jaws, yokes extending around the same affording support therefor, and toggle levers connected to transmit pressure through said yokes and sealing jaws.

11. A device of the class described comprising a split sealing member, means for supporting said split member, frame members hingedly connected to open relative each other and affording guides for said sealing member, and toggle bars connected to said frame members and adapted to transmit pressure to said sealing member.

In testimony whereof I have hereunto subscribed my name in the presence of two subscribing witnesses.

GUSTAVE LIDSEEN.

Witnesses:
 LAWRENCE REIBSTEIN,
 GEORGE R. MOORE.